Figure 1:
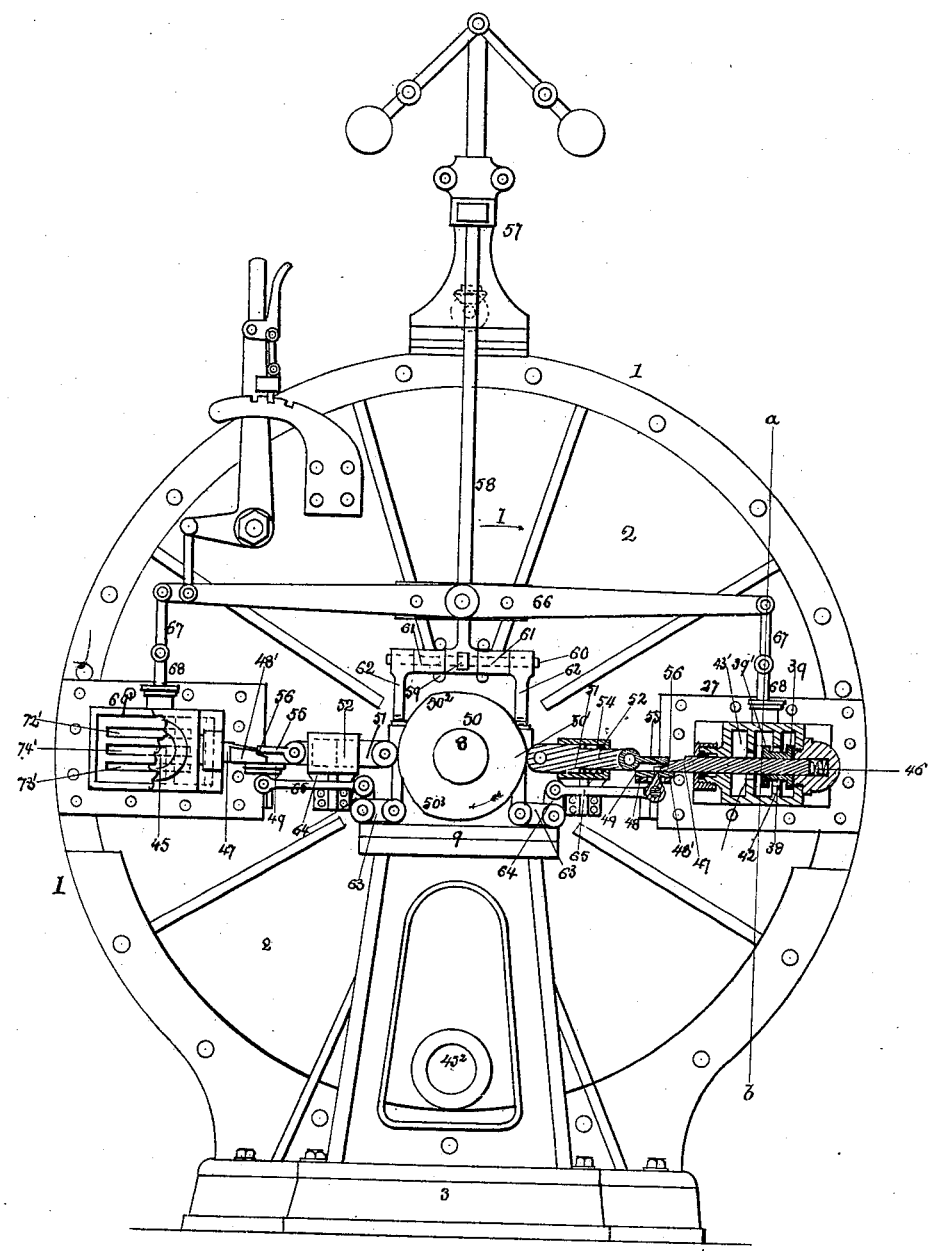

No. 646,392. Patented Mar. 27, 1900.
R. SMITH.
ROTARY ENGINE.
(Application filed Sept. 11, 1899.)
(No Model.) 6 Sheets—Sheet 1.

Witnesses.
H. A. Curtis
E. G. Wiswall

Inventor.
Richard Smith
by F. Curtis. Atty.

THE NORRIS PETERS CO., PHOTO-LITHO., WASHINGTON, D. C.

No. 646,392. Patented Mar. 27, 1900.
R. SMITH.
ROTARY ENGINE.
(Application filed Sept. 11, 1899.)

(No Model.) 6 Sheets—Sheet 2.

Witnesses.
H. A. Curtis
E. G. Wiswall

Inventor.
Richard Smith.
by H. Curtis. Atty.

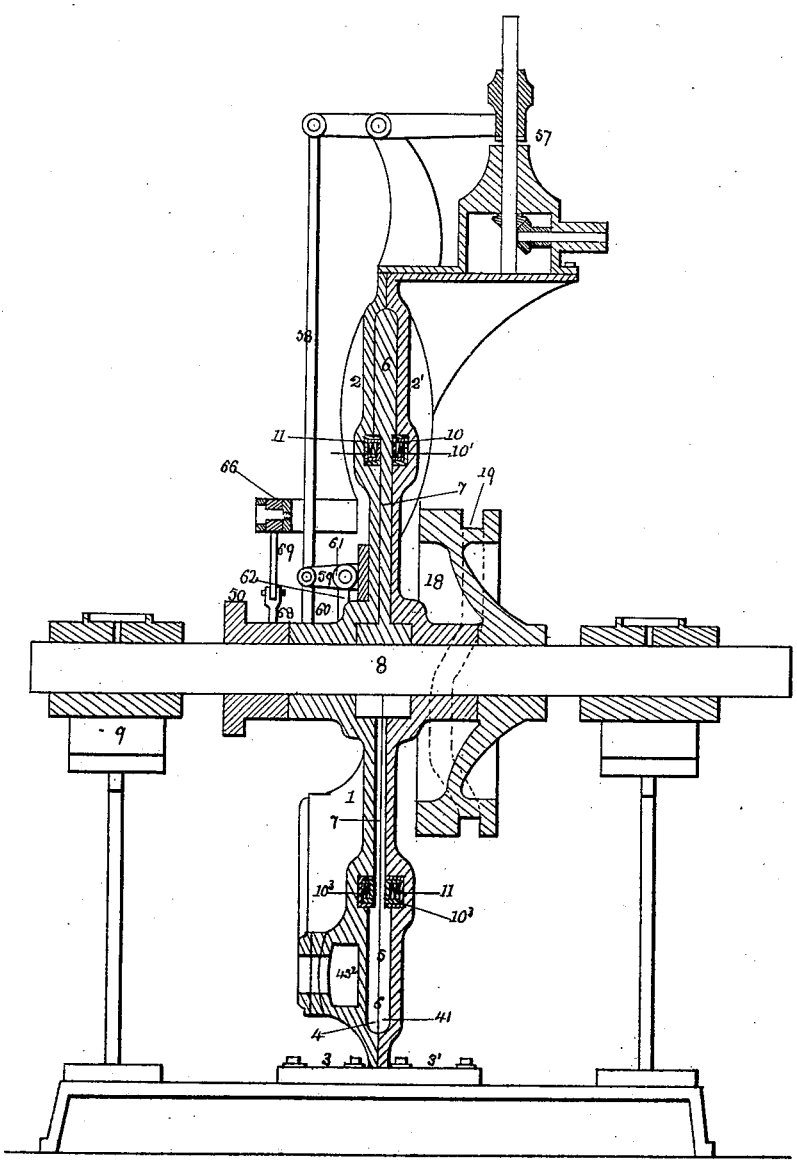

No. 646,392. Patented Mar. 27, 1900.
R. SMITH.
ROTARY ENGINE.
(Application filed Sept. 11, 1899.)
(No Model.) 6 Sheets—Sheet 4.

Witnesses.

Inventor
Richard Smith.
by F. Curtis, Atty.

No. 646,392. Patented Mar. 27, 1900.
R. SMITH.
ROTARY ENGINE.
(Application filed Sept. 11, 1899.)
(No Model.) 6 Sheets—Sheet 5.
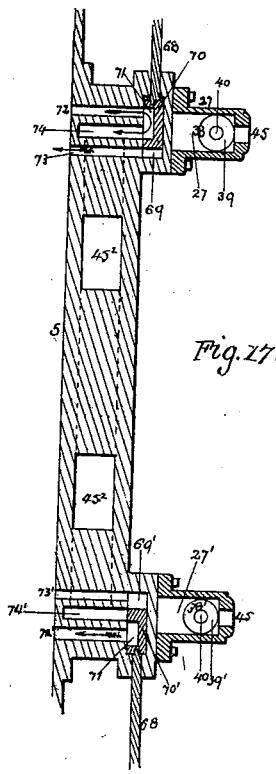
Fig. 17.
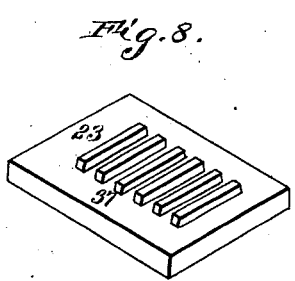
Fig. 8.
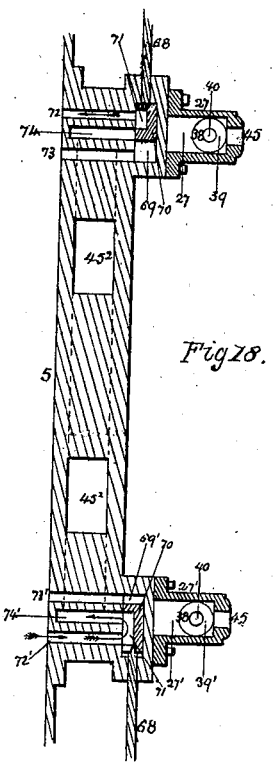
Fig. 18.
Fig. 5.
On line a.b. of Fig. 1.
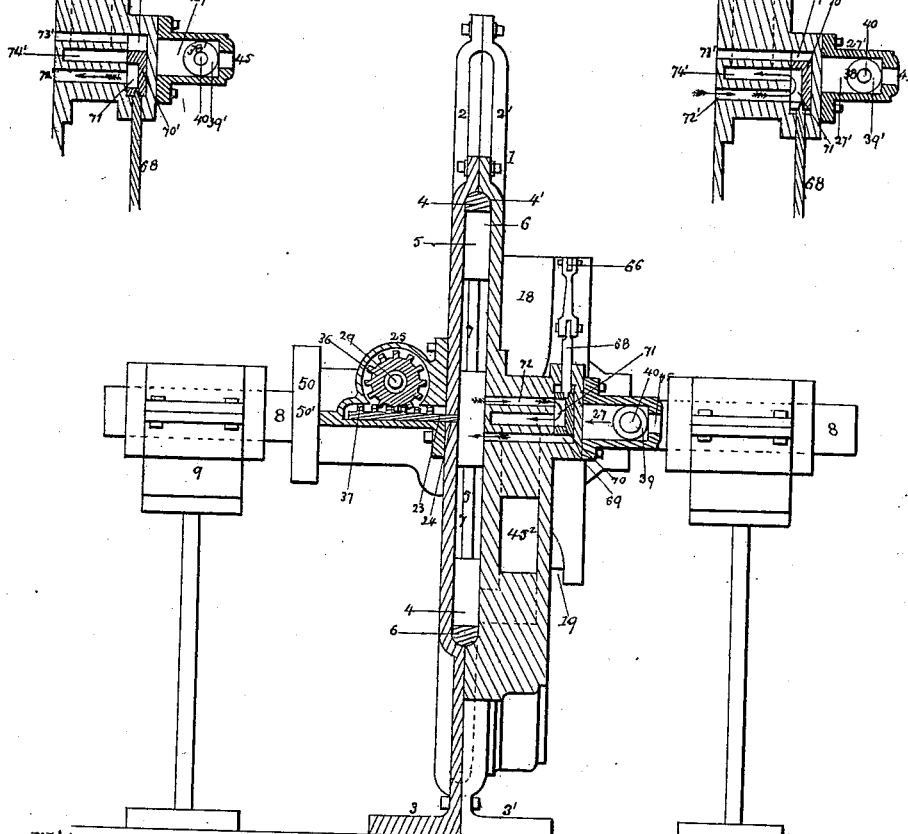
Witnesses.
Inventor.
Richard Smith.
by F. Curtis. Atty.

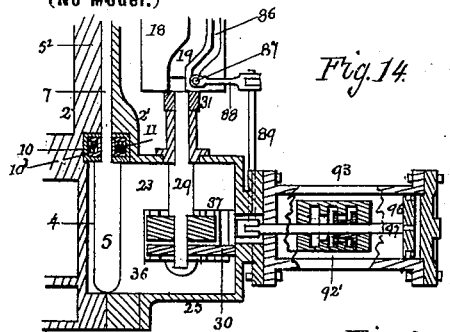

UNITED STATES PATENT OFFICE.

RICHARD SMITH, OF SHERBROOKE, CANADA, ASSIGNOR OF ONE-HALF TO WILLIAM FARWELL, OF SAME PLACE.

ROTARY ENGINE.

SPECIFICATION forming part of Letters Patent No. 646,392, dated March 27, 1900.

Application filed September 11, 1899. Serial No. 730,061. (No model.)

*To all whom it may concern:*

Be it known that I, RICHARD SMITH, a citizen of the Dominion of Canada, residing at Sherbrooke, in the county of Sherbrooke and Province of Quebec, Canada, have invented certain new and useful Improvements in Rotary Engines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention is based upon a class of rotary steam or other fluid engines in which is employed a circular annular cylinder or piston-chamber and a series of pistons adapted to traverse such cylinder and secured to the periphery of a circular rotary disk or piston-carrier and in the employment, in connection with such cylinder and piston-carrier and pistons, of twin steam chests and valves disposed upon diametrically-opposite sides of said cylinder, and in the further employment, in combination with said cylinder, pistons, and steam-chests, of twin shifting gates or cylinder-heads which at one point in the traverse of the pistons constitute heads or abutments to close the cylinder behind a piston and at another point in the traverse of a piston to move out of said cylinder and leave the latter unobstructed to permit of passage of the next succeeding piston.

My present improvements consist, first, in novel mechanism for actuating the shifting cylinder-head; second, in the peculiar form of mechanism for actuating the steam-inlet valve; third, in an improved construction of a device which operates automatically to "cut off" the supply of steam to the cylinder at any desired point in the stroke of each piston; fourth, in the novel construction of each piston whereby the extent of throw of each shifting cylinder head or gate across the piston-chamber is reduced to the smallest possible extent, while at the same time the effective pressure area of the piston is increased; fifth, in an improved construction of the rings employed for packing the joint between the rotary piston-carrier and the case of the engine, and, sixth, in certain other details of construction to be hereinafter explained.

Figure 12:
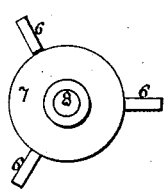
Figure 11:
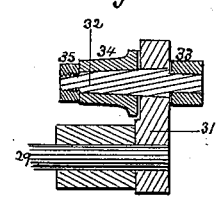
Figure 10:
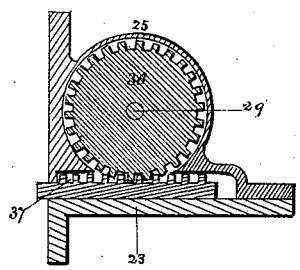
Figure 2:
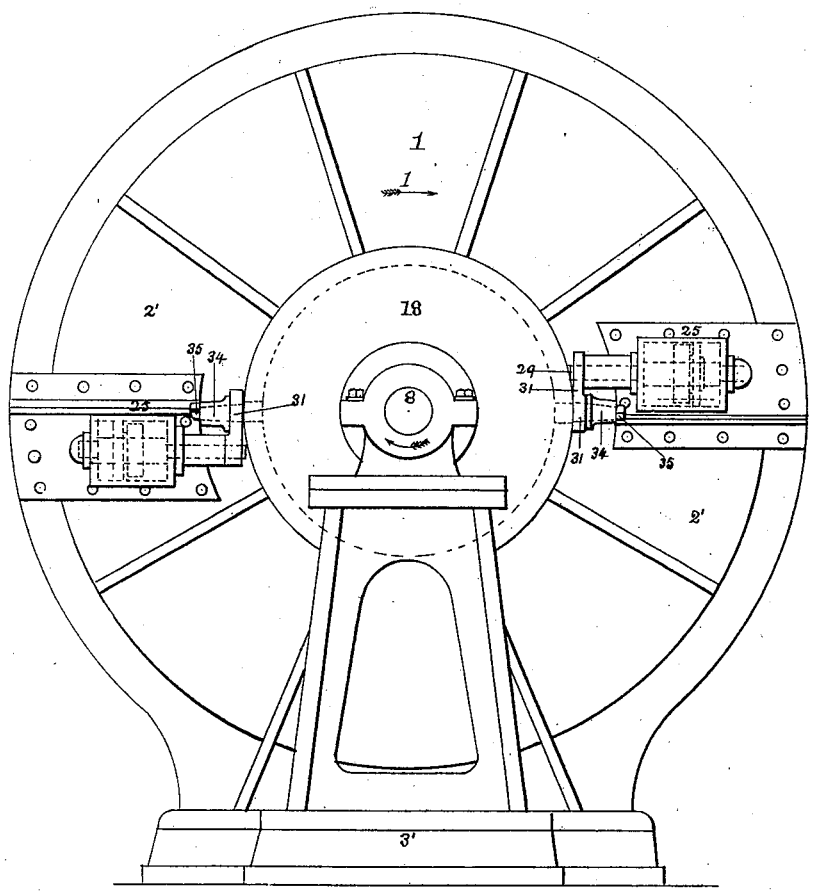
Figure 6:
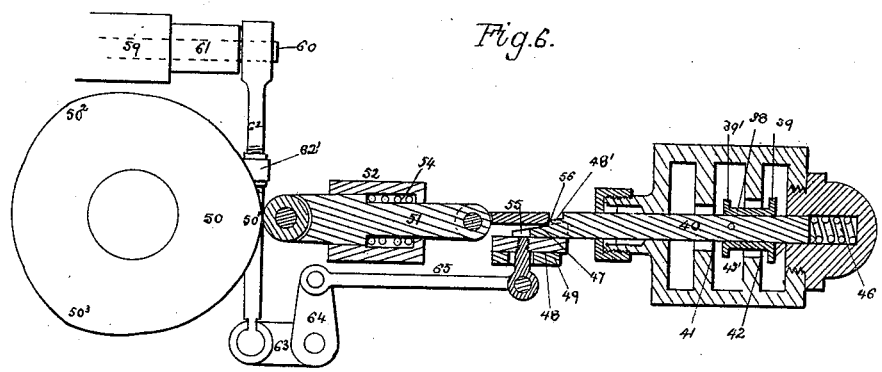
Figure 4:
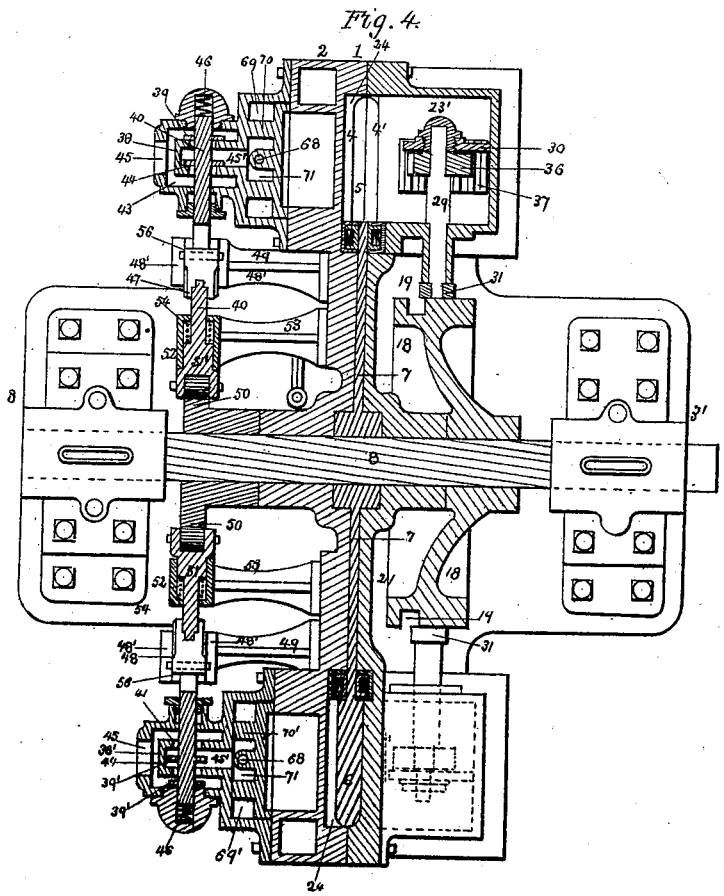

The drawings accompanying this specification represent in Figure 1 a front elevation, in Fig. 2 a rear elevation, in Fig. 3 a vertical central and longitudinal section, and in Fig. 4 a horizontal central section, of an engine containing my improvements. Fig. 5 denotes a vertical longitudinal section through the valves and shifting cylinder-heads. Fig. 6 is a vertical section of the main steam-valve and its operative mechanism. Fig. 7 is a vertical longitudinal section of one of the shifting cylinder-heads and the device for actuating the same, while Fig. 8 is a perspective view of one of the shifting gates. Fig. 9 is an end view, and Fig. 10 a cross-section, of the shifting cylinder-head and the chest which contains it. Fig. 11 is a section of the truck connecting the cylinder-head with the cam-groove which operates it. Fig. 12 is a face view of the piston-carrier and pistons. Fig. 13 is an enlarged section of one of the packing-rings. Fig. 14 represents a device for actuating the shifting gates in connection with the cam-groove. Fig. 15 is a face view, and Fig. 16 a section, of a modified form of packing-ring. Figs. 17 and 18 are sections of the reversing-valve. Fig. 19 represents a view of a device for actuating the shifting gates in connection with the cam-groove.

In the drawings, 1 represents the general structure or body of the engine, the same consisting of twin vertical circular casings 2 2', such casings terminating at bottom in bases 3 3', which together constitute the bed-plate, the semicases 2 2' being bolted together face to face. Each casing 2 2' has upon its interior face and near its periphery a semicylindrical annular channel 4 or 4', which when the two casings are bolted together, as stated, form the piston chamber or cylinder 5 of the engine.

The pistons which traverse the cylinder or piston-chamber 5 are shown in the present instance as three in number, 6 6 6, of a diameter or thickness to closely fill said cylinder 5, and the piston-carrier is to be "packed" with a suitable packing for preventing escape of steam between it and the chamber or channel in the body of the engine which contains such carrier. The pistons are equidistant and secured to or formed upon the periphery of the carrier, which is shown at 7 as a circular disk secured axially to a horizontal shaft 8, which is journaled at its front end in a standard 9, erected in front of the body of the engine, while its rear end is journaled in a standard in rear of said body.

As the periphery of the piston-carrier 7 extends to the piston-chamber 5, it becomes necessary, in order to prevent escape of steam from said piston-chamber, as before stated, to pack the joint between and about the parts.

Packings heretofore used in this class of engine consist simply of a flat ring, the inner face of which abuts against the sides of the piston-carrier, such ring being contained within a circular channel cut in the casing and crowded up to the piston-carrier by springs behind it.

In practical use of the engine certain defects have been found to exist in this form of packing-ring, to remedy which is one of the features of my present improvements, and I effect the object by constructing each ring of two annular cups 10 10', the smaller, 10', of the cups being of such diameter as to tightly fill the larger, 10, when inserted, mouth inward, within the latter, a coiled spring 11 being contained within the box thus produced and serving to crowd the two rings apart. This double cup or ring is contained within a circular channel $10^3$, cut in the inner face of each casing, and the spring 11 exerts its stress to crowd the inner annular cup or ring 10' against the face of the piston-carrier. The two interlocking cups or rings provide a double means of preventing escape or leakage of steam from the cylinder between the piston-carrier and engine-casing.

In Figs. 15 and 16 of the accompanying drawings is represented an alternative form of packing-ring, which consists of a single ring with an annular channel and having cross-grooves 17 17 cut in its ledges or walls to inclose an abutment 16 cast upon the casing.

In rear of the body of the engine and secured axially to and rotating with the drawing-shaft 8, as well as synchronously with the rotations of the piston-carrier, is a circular hub or disk 18, in the periphery of which is sunk an endless cam-groove 19. The function of the cam-groove 19 is to operate the shifting cylinder-heads, and it is formed in two equal sections or divisions 21 21' and 22 22', the two former being disposed upon one side of the periphery of the hub 18 and being of considerably greater length than the latter, which are situated upon the opposite side of such periphery, the distance between the two sections of the groove transversely of the disk determining the extent of throw of the gate. Heretofore the connection between each shifting gate and the cam-groove was simply a rod secured at one end to such gate and extending outward from the gate-chamber, with its outer end entering the said cam-groove. To remedy certain objections to this manner of operating the gate, I proceed as follows: The twin gates are shown at 23 23' as disposed upon diametrically-opposite sides of the rear of the engine-body and in alinement with the steam chest and valves, which, as before stated, are similarly situated on the front of the said body, and each gate is in the form of a flat rectangular plate adapted to slide horizontally and laterally in its chest and with respect to the piston-chamber, an opening 24 being formed in the casing to open communication between the two. Each gate or cylinder-head constitutes, when pushed across the piston-chamber, a head to close the cylinder behind a piston and resist the impact of the steam. When the gate is withdrawn, the cylinder or piston-chamber is unobstructed and allows of the passage past the gate of the next advancing piston. Each gate is contained within a closed box or chest 25, secured to the casing of the engine, each chest 25, as before stated, communicating with the piston-chamber by the passage 24, the steam-chests in turn being shown at 27 27'.

To effect the necessary reciprocating movements of each gate synchronously with the opening and closing of the steam-inlet valves, I employ a horizontal shaft 29, which is mounted at one end in bearings 30 in the interior of each chest 25, (see Fig. 7,) such shaft extending outward through one side of the chest and carrying upon its outer end a rocker-arm or crank 31. This arm 31 bears upon its free end a "truck," so called, for engaging the cam-groove 19 of the hub or disk 18, before described, said truck being composed of a spindle 32, which bears upon its outer end an antifriction-roller 33, adapted to take into said groove, this spindle being contained and supported within a sleeve 34, which is secured at its base in a suitable manner to the tail of the arm or crank 31. The spindle and the bore of the sleeve are tapering, and upon the inner end of the former is screwed a nut 35, which bears upon the inner end of the sleeve. The long bearing which the sleeve provides constitutes a firm and rigid support to resist the severe thrust upon the truck, while the tapering form of said sleeve and spindle enables wear and looseness of the parts to be compensated for. The rocking of each shaft 29 is transmitted to the respective gate through the agency of a spur-gear or sectoral toothed plate 36, contained within the gate-chamber and secured to said shaft, this gear 36 engaging a toothed rack 37, formed upon the upper face of the gate.

In order that the antifriction-roller of each gate shall be disposed in the same horizontal plane with the axis of the disk or hub 18 and its cam-groove 19, I invert one of the gate-chests with respect to the other, as shown in Fig. 2 of the drawings—that is to say, the operative mechanism consisting of the gear 36, rack 37, and truck are disposed above such axis on one side of the engine and of the disk and below the same upon the opposite side thereof.

In rotary engines of the class herein first premised each piston, in order that the expanded steam may be utilized in the cylinder to the highest degree of efficiency, should be maintained under pressure for the greater portion of its stroke, and theoretically the shifting cylinder-head should when live steam is admitted to the cylinder close behind the piston with absolutely no loss of time. As this is manifestly impossible, I have endeavored to approach as near as possible to such result, and to carry out this feature of my present improvements I form each piston of an elongated parallelogram, as distinguished from the cylindrical form heretofore adopted, the piston-chamber being, of course, of the same shape as the piston. By thus dispensing with the short cylindrical piston and adopting the long one last explained I accomplish two important results—first, reduce to the lowest possible degree the thickness of the piston and the consequent throw of the shifting gate, and, second, increase the effective area of the piston to any desired extent.

The twin live-steam inlet-valves of this engine are shown at 38 38' as of any well-known modern construction, being in the present instance composed of two circular disks 39 39', secured to a common stem 40, each valve operating horizontally with corresponding seats 41 42, communicating with the interior of each steam-chest 27 or 27', before named, the steam-inlet of each chest being shown at 45, while the valves are each closed upon their seats by the stress of a spring 46, interposed between the outer end of the stem and the head of the chest.

To operate the valves 38 or 38', I employ twin devices, each of which consists as follows: The inner end of the valve-stem 40 terminates in a rectangular head 47, (see Figs. 4 and 6 of the drawings,) which is adapted to reciprocate horizontally within a groove 48, created in the upper face of a horizontal bracket 49, secured at its base to the front casing of the engine. The side walls or ledges 48' 48' of the channel or groove 48 in the bracket 49 are inclined planes or wedges, receding in depth in a direction away from the valve 38 or 38', these inclines being disposed beneath a tripper to be explained.

50 in the drawings represents a three-part wiper-cam, the divisions 50' $50^2$ $50^3$ of which are of equal thrust and equidistant, this cam being secured to the front end of the driving-shaft 8, the periphery of this cam wiping against the inner extremity of a horizontal spindle 51, which is contained and adapted to reciprocate within a hollow head 52, which constitutes the outer end of a second horizontal bracket 53, secured at its base to the front of the engine and alongside the bracket 49.

Within the interior of the head 52 is located a spring 54, which exerts its stress to maintain the spindle in contact with the periphery of the cam 50.

To determine the point at which influx of live steam to the cylinder shall be cut off, I pivot to the outer end of the spindle 51 one end of a horizontal latch-plate or "tripper" 55 or 55', the outer and free end of which tripper rests upon the top of the head 47 of the valve-stem 46 and operates in connection with a step 56, formed upon the upper surface of the said head 47. The spring 46, which closes the steam-valve 38 or 38' upon its seat, also maintains the step 56 and tripper 55 in contact when the two latter are in engagement.

When the spindle 51 and tripper 55 of one set of valve-operative mechanisms are at their extreme of outward movement, the tripper is in contact with or abuts against the step 56, before named, and the valve 38 or 38' is wide open and permitting steam to enter the cylinder, the disposition of the two valves and their actuating devices being such that as one valve is being opened, as last explained, the opposite valve is being closed by the action of its spring and the recession of the opposite cam, the tripper of this last-named valve mechanism being out of contact with the step of the valve-stem. As the valve first named reaches the point at which it is necessary to cut off the further entrance of steam, the tripper ascends the inclined planes 48' 48' and is thereby raised above and out of engagement with the step 56 of the valve-stem, and the valve is closed by the action of its spring 46. The piston which is at this time the active one continues its advance until its stroke is completed and the expanded steam is spent, when such steam exhausts through the exhaust-port 45' of the steam-chest and into the common main exhaust-passage $45^2$ of the engine. Simultaneously with the closing of the last-named valve the cam approaches and begins to open the opposite valve, and the movements of this opposite valve become repetitions of the first.

To automatically control the movements of the cut-off mechanism, I employ a governor of any of the well-known varieties in use.

In the accompanying drawings the governor is shown at 57 as secured to the top front part of the body of the engine, the stem 58 of such governor descending in front of said body and being pivoted at its lower end to the outer and free end of a horizontal rocker-arm 59, the base of which is secured to a horizontal rock-shaft 60, journaled in bearings 61, secured to said engine-front and over the driving-shaft 8. To each extremity of the rock-shaft 60 is pivoted the upper end of a vertical connecting-rod 62, the lower extremity of each of these rods being in turn pivoted to the tail of a horizontal rocker-arm 63, the base of which is pivoted to the top of the front standard of the engine. The outer extremity of the rocker-arm 63 terminates in an upright arm 64, to the upper end of which one end of a horizontal connecting-rod 65 is pivoted, the opposite end of this latter rod being in turn pivoted to the under side of the grooved head 47, before described. Fluctuations of the governor effect, through the mechanism last described, corresponding movements of the inclined planes 48' 48' in a direction toward or away from the axis of the cam 50, and thereby vary in a corresponding degree the point at which steam shall be cut off from the cylinder, the said inclines crowding the tripper from contact with the step of the valve-stem in consonance with the variations of the governor.

To effect a secondary and nice adjustment of the position of the inclines 48' with respect to the step 56 of the valve-stem and to the tripper or latch-plate 55, as well as to the governor, each connecting-rod 62 is formed of two parts, the respective ends of which have right and left screw-threads cut upon them, these screw-threaded ends being inclosed by a similarly-threaded nut 62'. Turning the nut in one or the other direction has the effect of increasing or diminishing the length of the rod, thereby forcing the inclines 48' toward or away from the cam 50, the result being that the tripper remains in engagement with the step 56 for a greater or less length of time, and thereby effects an increased or diminished throw of the steam-valve.

To provide means for readily and quickly reversing the motion of the engine, I proceed as follows: To the front casing of the engine and above the rock-shaft 60 before named I pivot at its center a horizontal working beam or double lever 66, to each extremity of which I pivot the upper end of a vertical link 67, the lower extremity of each of these links being pivoted to the upper end of a vertical stem 68, which enters the top of a secondary steam-chest 69 or 69', composing part of or being interposed between the steam-chest proper, 27 or 27', and the cylinder or piston-chamber 5. (See Figs. 17 and 18 of the drawings.) The valve in the chest 69 or 69' is shown at 70 or 70' and the pocket of such valve at 71, while the ports leading from the two chests are shown, respectively, at 72 73 72' 73' 74 74', 72 73 and 72' 73' being the live-steam ports and 74 74' the exhaust-ports, the construction of such valve and ports being the same as in steam-engines in general use. The ports 72 73 72' 73' 74 constitute simply extensions of the corresponding ports of the steam-chest proper, and so long as the engine is to run continuously in one or the other direction the valve 70 or 70' is at rest and the reversing mechanism idle. When it is desired to reverse the motion of the engine—that is, of the piston-carrier and pistons—the lever 66 is tilted in one or the other direction and the relative positions of the reversing-valves 70 70' are reversed. In one position (see Fig. 17 of the accompanying drawings) the live-steam port 72', leading from the reversing or secondary valve chest 69' to the piston-chamber 5, is open and communicating, through the pocket of the valve 70', with the piston-chamber to supply live steam to such piston-chamber from the main-valve chest 27' and rotate the piston-carrier in one direction, the supply-ports of which chest are open to said chest 69', the exhaust-port 74' (which, as before stated, is a prolongation of that of the main-valve chest 27') being of course closed. At the same time the port 72 of the opposite secondary-valve chest 69 is open from the piston-chamber 5 to the exhaust-port 74 of said chest 69, and spent steam exhausts through said ports 72 74 by way of the pocket of the valve 70.

In Fig. 18 of the drawings the relative positions of the valves and ports last named are reversed, (by the reversal of the working beam,) the live-steam port 72, leading from the reversing-valve chest 69, is open and (through the pocket of the valve 70) communicating with the piston-chamber 5 to supply live steam to said chamber from the main-valve chest 27, the supply-ports of which latter are now open to said secondary-valve chest 69, and the piston-carrier is rotated in a direction opposite to that first described, while at the same time the port 72' of the opposite secondary-valve chest 69' is open to communication with the piston-chamber, and spent steam is exhausting from the latter through said port 72' and the main-valve chest 27' by way of the pocket of the valve 70', the live-steam ports leading from the main steam-chest to said chest 69' being closed and the exhaust-port of said main chest (which, as before stated, is part of the exhaust-port 74') being open.

To relieve the thrusts and strains upon the truck and gate connections owing to the sudden and rapid reciprocations of the latter at the hands of the cam-path, and thereby lessen to a great extent the noise resulting therefrom, I combine with the engine a small auxiliary reciprocating steam-engine, which performs the labor of driving the gate, the times of movement only of the gate being governed by the cam-path.

In Fig. 14 of the drawings I have shown a horizontal compound section of a steam-engine connected with the engine proper, such section being intended to show both the cylinder and piston and the valve and ports of such engine. In Fig. 19 I have shown a vertical section of the said auxiliary engine, the shifting gate, and the disk or hub containing the cam path or groove. In these figures, 86 denotes a second cam-path sunk in the periphery of the disk or hub 18, this second path being designed to operate the valve of the auxiliary engine and being parallel with the main groove 19. Operating with the auxiliary cam-path 89 is a truck 87, forming part of or constituting the inner end of a horizontal connecting-rod 88, the outer end of which is pivoted to one end of a horizontal rock-shaft 89, journaled in suitable brackets or bearings affixed to the rear of the engine-casing, an upright rocker-arm 90 being affixed at its lower end to the opposite end of said rock-shaft, while the upper end of said arm 90 is in turn pivoted to the inner extremity of a horizontal valve-stem 91, the opposite end of which is secured to a valve 92, contained within a steam-chest 92', making part of a horizontal cylinder 93, the live-steam ports of said steam-chest being shown at 94 94 and the exhaust-port of the same at 95, while the piston of the cylinder 93 is shown at 96 and its stem or rod at 97. The cylinder 93, piston 96, valve 92, and steam-chest 92' constitute an ordinary reciprocating steam-engine, which contains no invention of my own. To adapt the piston 96 to operate or aid in operating the shifting gate or cylinder-head 23 or 23', I secure the inner end of the piston-rod 97 to the adjacent end of the gate, as shown at 98. The movements of the valve are so "timed" as to admit live steam to the cylinder behind the piston 96 immediately prior to the time at which the main cam-path 18 permits the gate to begin its opening or closing movement, the result being that the piston 96 performs the labor of operating the gate, while the cam groove or path 18 determines the time at which these movements of the gate in opening and closing shall begin and end.

The operation of my engine is as follows: Supposing, as a starting-point, the gate 23 to be closed and a piston 6 slightly in front of it, the valve 38 in steam-chest 27 being about to open by the action of the division 50' of the cam 50, which travels in the direction of its arrow, while the opposite valve 38' is closed by its spring and the divisions 50' 52² of said cam 50 are idle, the antifriction-roller of the rod of said gate 23 resting in one of the long sections 21 or 21' of the cam-groove 18, steam flowing through the feed-ports of valve 38 enters the piston-chamber between the gate 23 and the piston in front of it, and the piston-carrier begins its rotation in the direction of the arrow 1 in Figs. 1 and 2 of the drawings, and the various pistons begin their traverse of the cylinder, and this continues until the piston first named reaches the point at which steam is to be cut off from said cylinder, when the division 50' of the wiper-cam 50 passes by the stem of the valve 38 and allows the latter to be closed by the action of its spring, the portion 50³ of said cam 50 in the meantime advancing toward the stem of the opposite valve 38'. The active piston continues its stroke (by the action of the expanding steam) until one-half of the cylinder has been completed, and such piston arrives at the opposite gate 23' and passes by the exhaust-port 74', (which is the one next in advance of it,) and the spent steam exhausts through such port 74', the antifriction-roller of the truck of the gate 23' during this movement of the active piston remaining in the long section 21 or 21' of the cam-groove until said exhaust-port 74' opens, at which time the truck of the opposite gate 23' enters the next ensuing short section of the groove, and thereby opens such gate 23' and leaves the cylinder unobstructed to permit of passage of the next advancing piston, which at this time is immediately behind the gate. As this piston last named passes by the gate 23' the truck of this gate enters the next or long division of the cam-groove and closes such gate behind the piston. Simultaneously with this last-named closing of the gate 23' and of the cylinder the section 50³ of the cam 50 has reached the stem of the opposite steam-inlet valve 38', and the latter is opened and permits steam to enter the cylinder between said gate and piston. This second piston last named continues its traverse of the cylinder until the entrance of steam to the latter is cut off and the exhaust-port of the opposite steam-chest 27' has been opened and the opposite gate 23 opened to permit of passage of a piston and closed behind such piston, at which time the wiper-cam is about in contact with the stem of the valve 38 first named, and the truck of the gate 23 enters the beginning of the next ensuing long section of the cam-groove (having left the short division thereof as the gate closed) and we are brought to the starting-point.

I claim—

1. The cut-off mechanism herein described, consisting of the inclined walls of the head of the bracket in the groove of which the head of the steam-valve plays, in combination with the tripper carried by the spring-impelled spindle which acts as an intermediary to communicate the motions of the wiper-cam to the steam-valve, through the stem of the latter, the cylinder and the piston operating therein, substantially as shown and described.

2. The mechanism herein described for operating each main steam-valve, consisting of the three-part wiper-cam carried by the driving-shaft, and wiping against the inner end of the stem of the valve through the agency of the intermediary spring-impelled spindle carrying upon its outer part the pivotal tripper which operates in conjunction with the step upon the outer part or end of the valve-stem, the cylinder and piston operating therein, essentially as explained.

3. The mechanism herein described for operating each shifting gate or cylinder-head, consisting of the spur-gear secured to the horizontal rock-shaft journaled within the gate-chest, and engaging a toothed rack formed upon the gate, the rock-shaft having affixed to its outer end a rocker-arm which carries a truck to engage the cam-groove and actuates it in combination with the cylinder and the piston operating therein, substantially as explained.

4. The herein-described construction of the truck carried by the rocker-arm of the gate-operating mechanism, the same consisting of the tapering spindle, carrying upon its outer end the antifriction-roller for engaging the cam groove or path which actuates such rocker-arm, said spindle being contained within the corresponding bore of the sleeve secured to said rocker-arm; a nut being screwed upon the end of the spindle, and bearing upon the rocker-arm, and serving to maintain a tight joint between the spindle and sleeve, in combination with the cylinder and the piston operating therein, substantially as explained.

5. In combination with the piston-chamber and the inclosure that contains the body of the piston-carrier, the two annular packing-cups, one of which is inserted mouth inward within the other, thus providing a box which contains a spring to crowd one cup against the face of the piston-carrier, essentially as and for the purpose explained.

6. The mechanism herein described for regulating the movements of the cut-off mechanism, through the medium of a governor, the same consisting of the horizontal rocker-arm, secured at its base to the horizontal rock-shaft which is journaled in brackets secured to the front of the engine, and has pivoted to each of its ends the vertical connecting-rod, the lower end of each of these rods being in turn pivoted to the tail of the horizontal rocker-arm; which arm, in its turn, is pivoted to the top of the front standard of the main shaft—the outer end of said rocker-arm terminating in the upright arm, the top of which is pivoted to the end of the horizontal rod which connects such arm with the spring-impelled spindle, that constitutes an intermediary to transmit the motions of the wiper-cam to the valve-stem, substantially as explained.

7. In combination with a cylinder, a rotary piston-carrier and pistons operating therein, gates and gate-operating mechanism controlling the passage of steam through said cylinder, steam-chests and inlet-valves operating therein, cams operating the said valves, movable intermediate devices governing the action of the same, and a governor and its connections automatically shifting the said devices toward or from the axis of the said cam to vary the point at which the steam shall be cut off from the cylinder, substantially as set forth.

8. In combination with a cylinder, a rotary piston-carrier and pistons operating therein, gates and gate-operating mechanism controlling the passage of steam through said cylinder, steam-chests and inlet-valves operating therein, steps on the rods of the said valves, trippers arranged for contact with the said steps, movable inclined planes adapted to be shifted into or out of position to lift the said trippers into such contact, and a governor and connections for automatically shifting the said inclined planes, substantially as and for the purpose set forth.

9. In combination with the cylinder and rotary piston-carrier and pistons of a rotary engine, a series of gates and a cam, grooved disk and connections for determining the time of the opening and closing of the said gates, and an auxiliary engine for driving the said gates, and devices engaging a second cam groove or path in the said disk for operating the valve of the said auxiliary engine, substantially as set forth.

10. In combination with the cylinder, rotary piston-carrier and pistons of a steam-engine, steam-inlet valves having steps on their stems, trippers arranged for contact with said steps, movable inclined planes for controlling the duration of the contact of the said trippers with the said steps, sectional connecting-rods provided with nuts for regulating the movement of the said inclined planes, and the necessary connecting mechanism, substantially as set forth.

11. In engines of the class herein first premised, the device for actuating the shifting gates, consisting of the toothed rack (upon each gate) which engages the spur-gear carried by the rocker-shaft journaled within the gate-chest, and actuated by a rocker-arm having a truck which engages the cam groove or path, that imparts vibratory motions to said rocker-arm, essentially as described.

12. A cam-disk having two paths or grooves in combination with an engine-cylinder, a piston-carrier and pistons rotating therein, gates operating to open and close the steam-space of said cylinder, a connecting-rod engaging one of the said paths, a rock-shaft provided with a rocker-arm and having the said connecting-rod pivoted on it, a valve connected to said rocker-arm, an auxiliary engine controlled by the said valve, connections between the said auxiliary engine and the said gates for operating them by steam directly applied, and devices making connection between the other cam-path of said disk and the said gates for regulating their time of action, substantially as set forth.

Sherbrooke, Province of Quebec, Canada, August 27, 1899.

RICHARD SMITH.

In presence of—
JOHN EMERSON CALHOUN,
FREDERICK GEORGE PECK.